(12) United States Patent
Shasha et al.

(10) Patent No.: US 11,016,697 B2
(45) Date of Patent: May 25, 2021

(54) PREFETCHING DATA BLOCKS FROM A PRIMARY STORAGE TO A SECONDARY STORAGE SYSTEM WHILE DATA IS BEING SYNCHRONIZED BETWEEN THE PRIMARY STORAGE AND SECONDARY STORAGE

(71) Applicant: INTERNATIONAL BUSINESS MACHINES CORPORATION, Armonk, NY (US)

(72) Inventors: Osnat Shasha, Holon (IL); Jonathan Amit, Omer (IL); Rivka Mayraz Matosevich, Zichron Ya'acov (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/460,960

(22) Filed: Jul. 2, 2019

(65) Prior Publication Data
US 2021/0004160 A1    Jan. 7, 2021

(51) Int. Cl.
*G06F 3/06*       (2006.01)
*G06F 12/0862*    (2016.01)

(52) U.S. Cl.
CPC ............. *G06F 3/065* (2013.01); *G06F 3/067* (2013.01); *G06F 3/0611* (2013.01); *G06F 12/0862* (2013.01); *G06F 2212/1021* (2013.01); *G06F 2212/602* (2013.01)

(58) Field of Classification Search
CPC ...................................................... G06F 3/065
See application file for complete search history.

(56) References Cited

U.S. PATENT DOCUMENTS

| | | | |
|---|---|---|---|
| 6,101,497 A * | 8/2000 | Ofek | G06F 11/1451 707/657 |
| 8,489,851 B2 | 7/2013 | Vamanan et al. | |
| 9,152,339 B1 * | 10/2015 | Cohen | G06F 3/065 |
| 9,330,048 B1 * | 5/2016 | Bhatnagar | G06F 13/1642 |
| 9,552,297 B2 | 1/2017 | Traut et al. | |
| 9,946,604 B1 * | 4/2018 | Glass | G06F 3/065 |

(Continued)

OTHER PUBLICATIONS

Kim, et al., "Path Confidence Based Lookahead Prefetching", IEEE, Mar. 2016, pp. 12.

(Continued)

*Primary Examiner* — Edward J Dudek, Jr.
(74) *Attorney, Agent, or Firm* — Konrad, Raynes, Davda & Victor LLP; David W. Victor; Alan S. Raynes

(57) ABSTRACT

Provided are a computer program product, system, and method for prefetching data blocks from a primary storage to a secondary storage system while data is being synchronized between the primary storage and secondary storage. A determination is made of data blocks to prefetch from the primary storage to the secondary controller not yet synchronized from the primary storage to the secondary storage in anticipation of future access requests for the data blocks to the secondary controller while data blocks are being synchronized between the primary storage and the secondary storage over the network. A prefetch command is sent to prefetch the determined data blocks to copy from the primary storage to the secondary controller to make available to future access requests received at the secondary controller for the determined data blocks.

22 Claims, 5 Drawing Sheets

(56) References Cited

U.S. PATENT DOCUMENTS

| | | |
|---|---|---|
| 10,146,448 B2 | 12/2018 | Kotte et al. |
| 10,296,255 B1* | 5/2019 | Tummala .............. G06F 3/0689 |
| 2013/0036280 A1* | 2/2013 | Futawatari ............ G06F 3/0665 |
| | | 711/162 |
| 2016/0323358 A1* | 11/2016 | Malhotra ............ G06F 16/1774 |
| 2018/0052622 A1 | 2/2018 | Kalos et al. |

OTHER PUBLICATIONS

"Cache Prefetching", Wikipedia, [online] [retrieved Jun. 12, 2019] pp. 5, https://en.wikipedia.org/wiki/Cache_prefetching.

* cited by examiner

PREFETCHING DATA BLOCKS FROM A PRIMARY STORAGE TO A SECONDARY STORAGE SYSTEM WHILE DATA IS BEING SYNCHRONIZED BETWEEN THE PRIMARY STORAGE AND SECONDARY STORAGE

BACKGROUND OF THE INVENTION

1. Field of the Invention

The present invention relates to a computer program product, system, and method for prefetching data blocks from a primary storage to a secondary storage system while data is being synchronized between the primary storage and secondary storage.

2. Description of the Related Art

In a data mirroring storage environment, data is copied from a primary storage system over a network to a secondary storage system. Failover programs, such as International Business Machines Corporation's ("IBM") HyperSwap® which is a function in the z/OS® operating system, provides continuous availability for storage failures by providing synchronous copies of source (primary) storage volumes in one or more storage systems to one or more target (secondary) volumes in one or more storage systems. (HyperSwap is a registered trademark of IBM in countries throughout the world). When a storage failure is detected, instead of failing an Input/Output (I/O) request to the primary storage volume, HyperSwap redirects the I/O request to the secondary storage volume. Data may also be mirrored as part of data migration to migrate data from a primary storage to a secondary storage.

While data is being mirrored from the primary storage to the secondary storage, hosts may also access data from the secondary storage system Hosts may be connected and direct I/O requests to the target (secondary) storage system which may not have a full copy of the data. In HyperSwap the host may connect to both systems and send I/O requests to both. Read requests on the paths towards the secondary storage system may be serviced directly at the secondary storage system. However, if the data between the storage systems is not fully synchronized, read requests are redirected to the primary volume until synchronization is complete.

There is a need in the art for improved techniques for managing I/O requests to a secondary storage system to which data is being mirrored from a primary storage system.

SUMMARY

Provided are a computer program product, system, and method for prefetching data blocks from a primary storage to a secondary storage system while data is being synchronized between the primary storage and secondary storage. A determination is made of data blocks to prefetch from the primary storage to the secondary controller not yet synchronized from the primary storage to the secondary storage in anticipation of future access requests for the data blocks to the secondary controller while data blocks are being synchronized between the primary storage and the secondary storage over the network. A prefetch command is sent to prefetch the determined data blocks to copy from the primary storage to the secondary controller to make available to future access requests received at the secondary controller for the determined data blocks.

DETAILED DESCRIPTION

The synchronization process to mirror data between a primary storage system and secondary storage system may take several hours to several days, depending on the amount of data to be synchronized, network connectivity and bandwidth, and the I/O load at the storage systems. When the secondary storage system is unsynchronized with respect to the primary storage system, each I/O request towards unsynchronized data at the secondary storage system may experience a latency because the data needs to be retrieved from the primary storage system. The I/O latency comprises a time for the I/O request to traverse the I/O path from the secondary storage system to the primary storage system and then the time for the accessed data at the primary storage system to return on the I/O path to the secondary storage system. By way of example, the I/O round-trip latency between the storage systems over extended distances may be greater than 100 milliseconds. Reducing this latency is critical to achieve optimal performance and reduce impact to the user environment.

Described embodiments provide improvements to computer technology by reducing I/O latency for accesses to data blocks at a secondary storage that are unsynchronized and need to be accessed from the primary storage by prefetching unsynchronized data blocks from the primary storage to the secondary storage system in anticipation of future I/O requests to unsynchronized data blocks at the secondary storage system. In described embodiments, a determination is made of data blocks to prefetch from the primary storage to the secondary controller not yet synchronized from the primary storage to the secondary storage. The data blocks are prefetched in anticipation of future access requests for the data blocks at the secondary controller not yet synchronized while data blocks are being synchronized between the primary storage and the secondary storage over the network. A prefetch command is sent to prefetch the determined data blocks to copy from the primary storage to the secondary controller to make available to future access requests received at the secondary controller for the determined data blocks. The prefetching of the unsynchronized data blocks eliminates read latency of unsynchronized data blocks.

Figure 1:
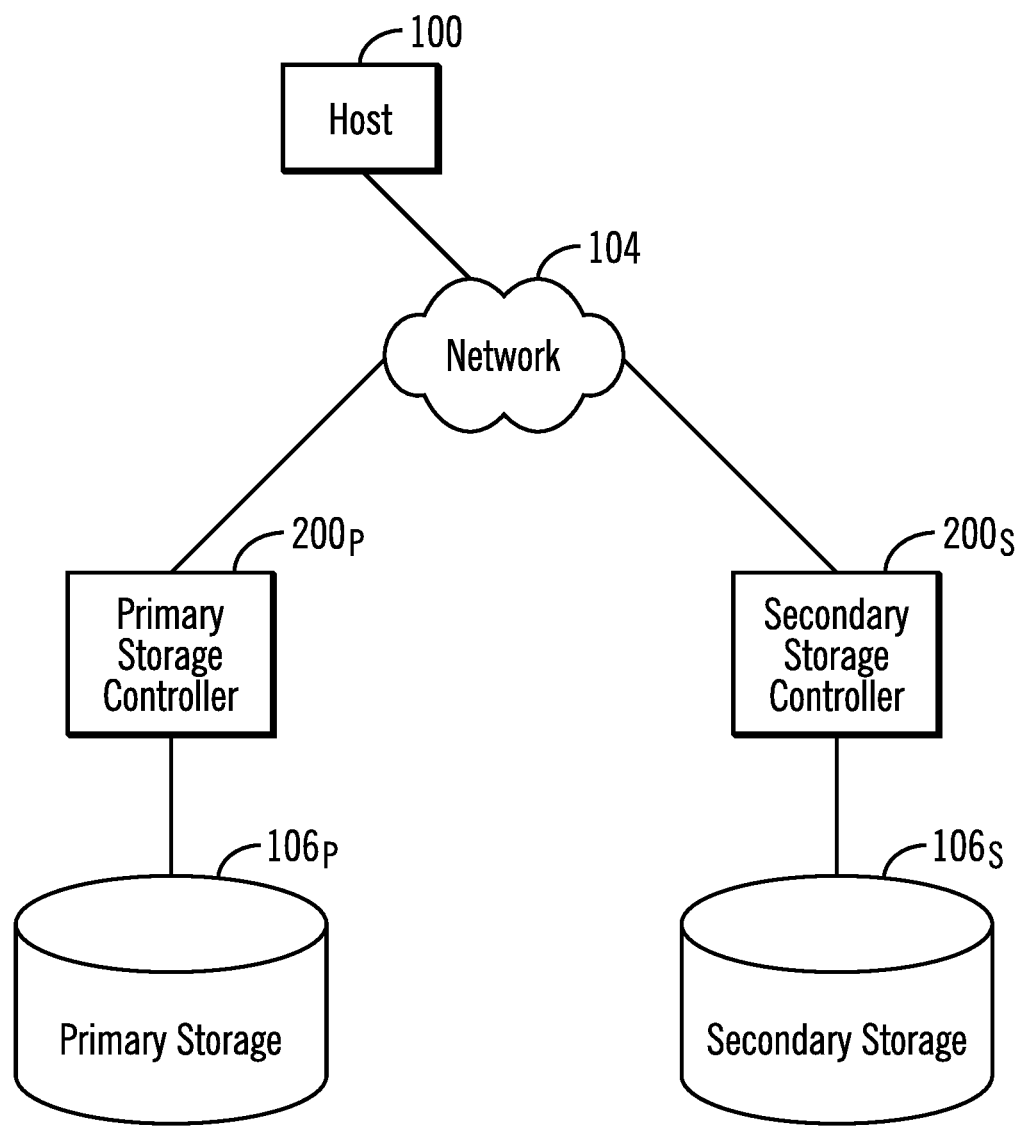
FIG. 1 illustrates an embodiment of a storage environment in which data is mirrored from a primary storage system to a secondary storage system.

FIG. 1 illustrates an embodiment of a data synchronization environment having a host system 100 that is connected to a primary storage controller $200_P$ and a secondary storage controller $200_S$ over a network 104. The primary storage controller $200_P$ manages access to a primary storage $106_P$ and the secondary storage controller $200_S$ manages access to a secondary storage $106_S$. Each storage controller $200_P$, $200_S$ manages access to volumes configured in logical subsystems in the storages $106_P$, $106_S$, respectively. There may be additional hosts (not shown) that provide Input/Output (I/O) requests to the storage controllers $200_P$, $200_S$. The primary storage controller $200_P$ and primary storage $106_P$ may be referred to as a primary storage system and the secondary storage controller $200_S$ and secondary storage $106_S$ may be referred to as a secondary storage system. The primary and secondary storage controllers may also be referred to as primary and secondary controllers.

The host 100 may direct requests for data blocks to the secondary storage controller $200_S$ while data is being synchronized.

In one embodiment, the primary storage controller $200_P$ may mirror data blocks in the primary storage $106_P$ to the secondary storage controller $200_S$. If the network 104 connectivity between the primary $200_P$ and secondary $200_S$ storage controller is disrupted, then the primary controller $200_P$ is prevented from mirroring the data blocks. Mirroring may also fail if the secondary storage system experiences a failure and then is recovered. Upon reestablishing connectivity over the network 104 between the storage controllers $200_S$ and $200_P$, the secondary storage controller $200_S$ may assume all data is out of synchronization and data blocks are indicated as synchronized upon receiving data blocks transferred from the primary storage controller $200_P$ to the secondary storage controller $200_S$ or indication from the primary storage controller $200_P$ that certain blocks are synchronized.

In further embodiments, the primary storage controller $200_P$ may migrate data blocks from the primary storage $106_P$ to the secondary storage $106_S$. Upon initiating migration, the secondary storage controller $200_S$ may assume all data is out of synchronization and data blocks are indicated as synchronized upon receiving data blocks transferred from the primary storage controller $200_P$ to the secondary storage controller $200_S$ or indication from the primary storage controller $200_P$ that certain blocks are synchronized.

The storages $106_P$, $106_S$ include volumes, where volumes may be configured in Logical Subsystems (LSS), where each LSS is comprised of multiple volumes. The term volume as used herein may refer to other types of storage units comprising addressable ranges of data, such as logical devices, logical drives, partitions, etc. A data block as used herein may comprise any addressable storage unit representing data in storage and memory, also referred to as a track, block, logical address, logical block address (LBA), physical block address, etc.

The storage controllers $200_P$, $200_S$, $200_i$ may comprise an enterprise storage controller/server suitable for managing access to attached storage devices, such as, but not limited to, the International Business Machine Corporation's ("IBM") DS8000® storage system or other vendor storage servers known in the art. (DS8000 is a registered trademark of IBM in countries throughout the world).

The network 104 may comprise a Storage Area Network (SAN), Local Area Network (LAN), Intranet, the Internet, Wide Area Network (WAN), peer-to-peer network, wireless network, arbitrated loop network, etc.

The storages $106_P$, $106_S$ may each be implemented in one or more storage devices, or an array of storage devices, may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Storage arrays may further be configured ranks in the storage devices, such as Just a Bunch of Disks (JBOD), Direct Access Storage Device (DASD), Redundant Array of Independent Disks (RAID) array, virtualization device, etc. Further, the storage devices in the storages $106_P$ and $106_S$ may comprise heterogeneous storage devices from different vendors and different types of storage devices, such as a first type of storage devices, e.g., hard disk drives, that have a slower data transfer rate than a second type of storage devices, e.g., SSDs.

Figure 2:
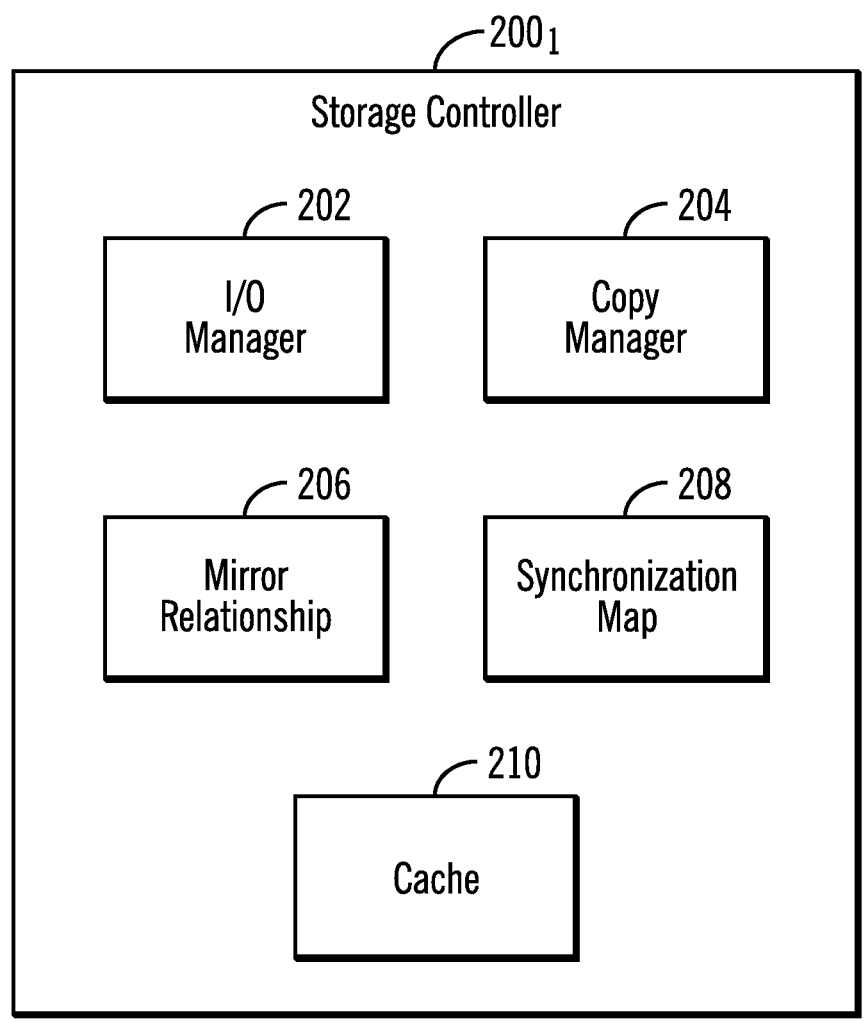
FIG. 2 illustrates an embodiment of a storage controller at the primary and secondary storage systems.

FIG. 2 illustrates an embodiment of components in a storage controller $200_i$, such as storage controllers $200_P$ and $200_S$, and includes an I/O manager 202 to manage I/O operations directed to a storage $106_P$, $106_S$ and a copy manager 204 to manage copy operations, such as synchronizing data from the primary storage $106_P$ and the secondary storage $106_S$. The copy manager 204 creates mirror copy relationships 206 indicating data blocks in the primary storage $106_P$ to copy to the secondary storage $106_S$ and maintains a synchronization map 208 including a bit for each data block in the primary storage $106_P$ to copy indicating whether the data block needs to be copied or has already been copied to the secondary storage $106_S$. The storage controller $200_i$ includes a cache 210 to cache updates to data blocks or data blocks transferred from the primary storage controller $102_P$. The cache 210 may not be needed if the block was not changed since the failure. The synchronization map 208 may comprise a data structure on data blocks in the mirroring relationship that need to be copied to the secondary storage system, such as bitmap having a bit for each data block in the primary storage $106_P$ to mirror.

Figure 3:
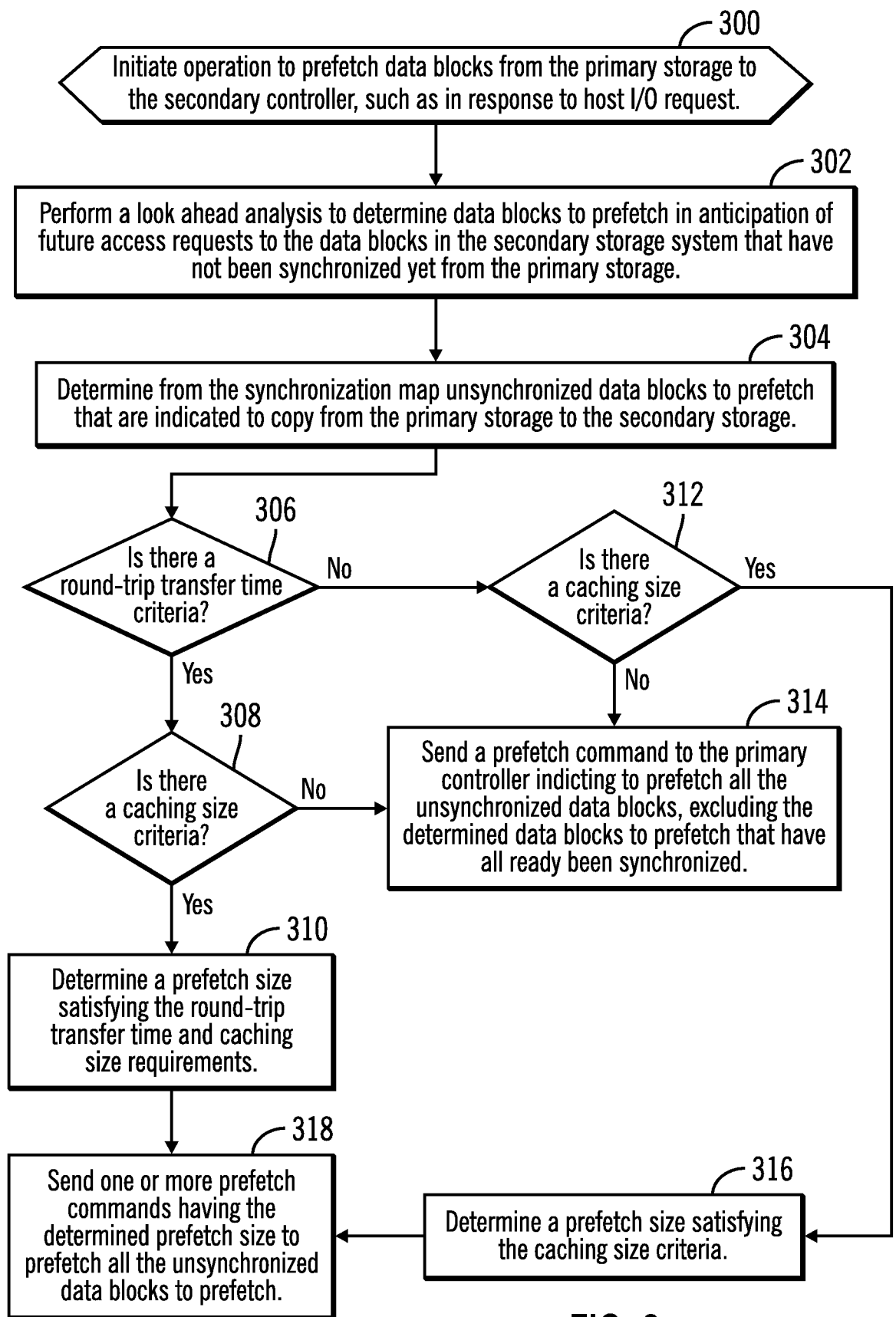
FIG. 3 illustrates an embodiment of operations to prefetch data from the primary storage to the secondary storage while data is being synchronized between the primary storage and the secondary storages.

FIG. 3 illustrates an embodiment of operations performed by the I/O manager 202 to prefetch blocks from the primary storage $102_P$ to the secondary storage $102_S$ while data blocks in the primary storage $102_P$ are being synchronized to the secondary storage $102_S$. Synchronization may be initiated after the secondary storage controller $200_S$ reestablishes a connection with the primary storage controller $200_P$ after network disruption or as part of data migration from the primary storage $106_P$ to the secondary storage $106_S$. Synchronization may be also initiated to migrate data blocks in the primary storage $106_P$ to the secondary storage $106_S$. After reestablishing a connection or starting migration, the synchronization map 208 at the secondary storage controller $200_S$ may be set to indicate that all data blocks being mirrored need to be copied from the primary storage $106_P$. The primary storage controller $200_P$ may indicate that certain blocks do not need to be copied in the synchronization map 208 if they were not changed since the time of the disconnect. The data blocks may be prefetched to make available to anticipated future read requests to the secondary storage $106_S$. In one embodiment, the prefetch operations may be performed by the I/O manager 202 at the secondary storage controller $200_S$ or at the primary storage controller $200_P$.

Upon initiating (at block 300) an operation to prefetch data blocks, the I/O manager 202 performs a look ahead analysis to determine data blocks to prefetch to store in cache 210 to make available to future access requests to the data blocks in the secondary storage 106. The look ahead analysis may be based on analyzing data access patterns, such as receiving a sequential read access that will access multiple sequential blocks, and the look ahead analysis may prefetch sequential data blocks to maintain in the cache 210 to be available for the sequential read requests when they arrive. The look ahead analysis may also use different methodologies for determining whether to prefetch and an amount of data blocks to prefetch based on other factors, such as regions of data blocks subject to frequent accesses, etc. In alternative embodiments, other pre-fetch algorithms may be used to determine blocks to prefetch, such as stream buffers, one block lookahead, strided prefetching, etc.

In certain embodiments, the trigger to initiate the look ahead analysis at block 300 may be a host read request to a data block in the secondary storage $106_S$ that is indicated in the synchronization map 208 as not yet copied or synchronized from the primary storage $106_P$ to the secondary storage controller $200_S$. In further embodiments, other triggers may initiate the look ahead analysis to prefetch.

After determining the data blocks to prefetch, the I/O manager 202 determines (at block 304) from the synchronization map 208 unsynchronized data blocks to prefetch that are indicated to copy from the primary storage to the secondary storage. In this way, already synchronized data blocks are not prefetched. If (at block 306) there is a round-trip transfer time criteria and if (at block 308) there is a caching size criteria, then I/O manager 202 determines (at block 310) a prefetch size satisfying both these requirements. To determine a prefetch size satisfying the round-trip transfer time requirement, the I/O manager determines, based on current network transmission conditions, a maximum amount of time to wait to prefetch a data block, a maximum number of data blocks that can be prefetched and satisfy a round-trip transfer time criteria. For instance, if the round-trip time is high, then more blocks may be prefetched to optimize the number of blocks prefetched in that higher round-trip time. To determine a prefetch size satisfying a caching size criteria, the I/O manager 202 determines a maximum number of data blocks that can be prefetched and satisfy a maximum amount of the cache that can be used to store prefetched data.

Other criteria may also be considered to limit the number of blocks to prefetch, such as available bandwidth on the network 104 between the primary $200_P$ and secondary $200_S$ storage controller. If there is a narrow network bandwidth connectivity, then the prefetch size may be set to a smaller number of blocks to avoid consuming too much of the network bandwidth, whereas for higher network bandwidth more blocks may be prefetched or there may be no limit due to this criteria.

If (at block 306) there is no round-trip transfer time criteria and if (at block 312) there is no caching size criteria, then the I/O manager 202 sends (at block 314) a prefetch command to the primary controller $200_P$ indicting to prefetch all the unsynchronized data blocks, excluding the determined data blocks to prefetch that have already been synchronized as indicated in the synchronization map 208. If (at block 312) there is a caching size requirement, then a prefetch size is determined (at block 316) satisfying the caching size criteria. After determining the prefetch size at blocks 310 or 316, the I/O manager 202 sends (at block 320) one or more prefetch commands having the determined prefetch size to prefetch all the unsynchronized data blocks to prefetch, such as dividing the total number of unsynchronized blocks to prefetch by the determined prefetch size.

With the embodiment of FIG. 3, data blocks that have not yet been synchronized to the secondary storage $106_S$ from the primary storage $106_P$ may be prefetched to obtain from the primary storage $106_P$ in anticipation of likely access request to these unsynchronized data blocks to avoid latency to respond to the access request. In this way, the latency of having to wait to retrieve the unsynchronized data block from the primary storage $106_P$ is avoided. Further, with the described embodiments, the prefetch is limited to only those data blocks that may be accessed that have not been synchronized or copied from the primary storage $106_P$ to conserve bandwidth. Yet further, to ensure the data blocks are prefetched within a round-trip time window, the determined data blocks to prefetch may be divided into smaller prefetch commands to satisfy round-trip time requirements to ensure the prefetched data is returned within a round-trip time threshold.

Further, with the described embodiments, the decision of how much data to prefetch depends on any combination of factors including a cache size, network bandwidth, and round-trip time. If the cache usage is higher, then less data should be prefetched each time or the prefetch size should be divided into multiple prefetch operations. If network bandwidth is low, then less data should be prefetched, but of bandwidth is higher, then more blocks may be included in the prefetch command. If the round-trip time is low, then fewer blocks should be prefetched, but if high, then more blocks should be prefetched.

Figure 4:
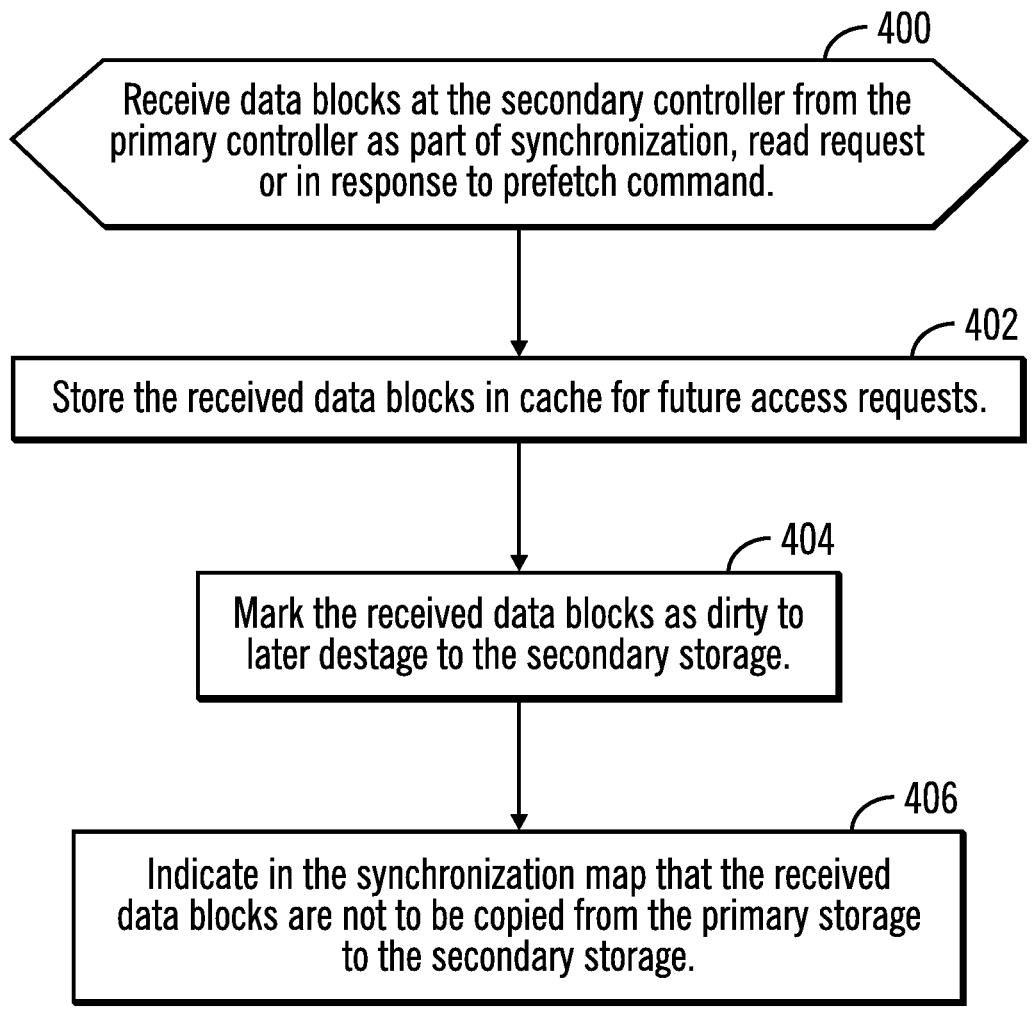
FIG. 4 illustrates an embodiment of operations to process received data blocks being synchronized at the secondary storage system.

FIG. 4 illustrates an embodiment of operations performed by the I/O manager 202 at the secondary storage controller $200_S$ upon receiving data blocks from the primary storage $106_P$, which may be received as part of synchronization, in response to a read request or in response to a prefetch command. Upon receiving (at block 400) data blocks from the primary storage $106_P$, the received data blocks are stored (at block 402) in cache 210 for future access requests. The received data blocks are marked (at block 404) as dirty or modified to later destage from the cache 210 to the secondary storage $106_S$. The I/O manager 202 indicates (at block 406) in the synchronization map 208 that the data block has been synchronized and does not need to be copied from the primary storage $106_P$.

With the embodiment of FIG. 4, receiving a data block from the primary storage system as part of synchronization, prefetch or in response to a read request results in indicating that the data block is synchronized so that future read requests and prefetch requests to that data block at the secondary storage controller $200_S$ may be accessed from the secondary storage system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
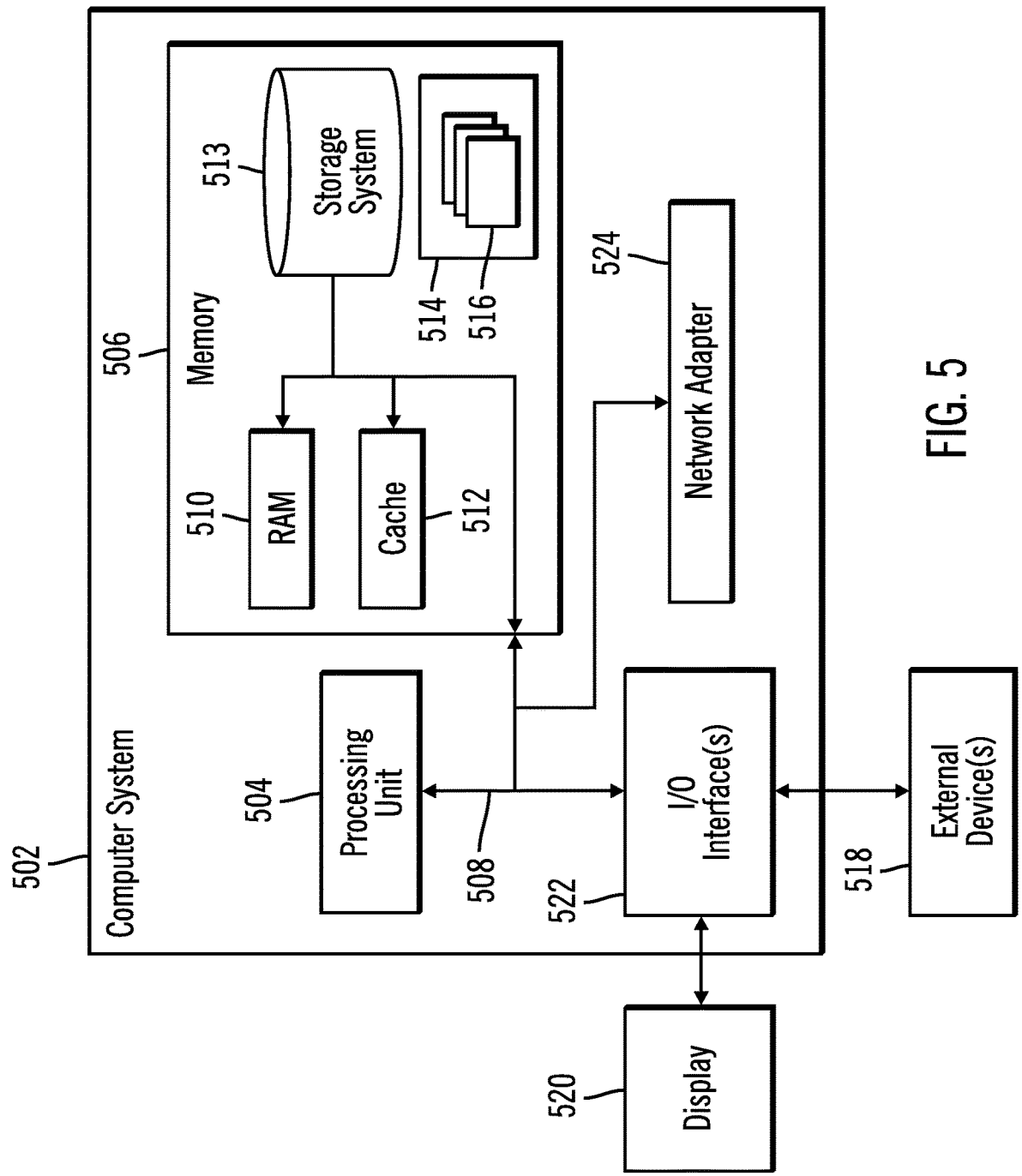
FIG. 5 illustrates a computing environment in which the components of FIG. 1 may be implemented.

The computational components of FIG. 1, including the storage controllers $200_P$, $200_S$ and host 100 may be implemented in one or more computer systems, such as the computer system 502 shown in FIG. 5. Computer system/server 502 may be described in the general context of computer system executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system/server 502 is shown in the form of a general-purpose computing device. The components of computer system/server 502 may include, but are not limited to, one or more processors or processing units 504, a system memory 506, and a bus 508 that couples various system components including system memory 506 to processor 504. Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 513 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 508 by one or more data media interfaces. As will be further depicted and described below, memory 506 may include at least one program product having a set (e.g., at least one) of program modules that are configured to carry out the functions of embodiments of the invention.

Program/utility 514, having a set (at least one) of program modules 516, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. The components of the computer 502 may be implemented as program modules 516 which generally carry out the functions and/or methodologies of embodiments of the invention as described herein. The systems of FIG. 1 may be implemented in one or more computer systems 502, where if they are implemented in multiple computer systems 502, then the computer systems may communicate over a network.

Computer system/server 502 may also communicate with one or more external devices 518 such as a keyboard, a pointing device, a display 520, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 522. Still yet, computer system/server 502 can communicate with one or more networks such as a local area network (LAN), a general wide area network (WAN), and/or a public network (e.g., the Internet) via network adapter 524. As depicted, network adapter 524 communicates with the other components of computer system/server 502 via bus 508. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing data synchronized between a primary storage managed by a primary controller and a secondary storage managed by a secondary controller, wherein the primary controller and the secondary controller communicate over a network, the computer program product comprises a computer readable storage medium having program instructions embodied therewith, the program instructions executable by a processor to cause operations, the operations comprising:

determining data blocks to prefetch from the primary storage to the secondary controller not yet synchronized from the primary storage to the secondary storage in anticipation of future access requests for the data blocks to the secondary controller while data blocks are being synchronized between the primary storage and the secondary storage over the network;

sending a prefetch command to prefetch the determined data blocks to copy from the primary storage to the secondary controller to make available to future access requests received at the secondary controller for the determined data blocks;

determining from a synchronization data structure the determined data blocks to prefetch that are indicated to copy from the primary storage to the secondary storage, wherein the prefetch command only indicates to prefetch the determined data blocks that are indicated to copy from the primary storage to the secondary storage; and indicating in the synchronization data structure to not copy from the primary storage to the secondary storage the determined data blocks prefetched from the primary storage to the secondary controller.

2. The computer program product of claim 1, wherein the operations further comprise:

determining from the synchronization data structure the determined data blocks to prefetch that are indicated not to copy from the primary storage to the secondary storage, wherein any of the determined data blocks that the synchronization data structure indicates to not copy from the primary storage to the secondary storage are excluded from the prefetch command.

3. The computer program product of claim 1, wherein the determining the data blocks and the sending the prefetch command are performed by the secondary controller, and wherein the secondary controller sends the prefetch command to the primary controller.

4. The computer program product of claim 1, wherein the operations further comprise:

determining a prefetch size satisfying a transfer criteria, wherein the determined data blocks to prefetch are included in prefetch commands having the prefetch size of blocks to prefetch to prefetch all the determined data blocks in the prefetch commands to satisfy the transfer criteria.

5. The computer program product of claim 4, wherein the transfer criteria comprises a round-trip transfer time, wherein the determining the prefetch size comprises:

determining a maximum prefetch size having an estimated time to transfer, based on a bandwidth and transfer time for the network, that satisfies the round-trip transfer time, wherein the determined prefetch size comprises the maximum prefetch size.

6. The computer program product of claim 4, wherein the transfer criteria comprises a caching size, wherein the determining the prefetch size comprises:

determining a maximum prefetch size that does not exceed the caching size, wherein the determined prefetch size comprises the maximum prefetch size.

7. The computer program product of claim 1, wherein data becomes out of synchronization between the primary storage and the secondary storage due to a disruption in connectivity in the network between the primary controller and the secondary controller, wherein the operations further comprise:

indicating, by the secondary controller, in the synchronization data structure to copy all data blocks in the primary storage to the secondary storage in response to reestablishing connectivity to the primary controller after the disruption in connectivity in the network; and determining from the synchronization data structure the determined data blocks to prefetch that are indicated as not to copy from the primary storage to the secondary storage, wherein any of the determined data blocks that the synchronization data structure indicates to not copy from the primary storage to the secondary storage are excluded from the prefetch command.

8. The computer program product of claim 1, wherein the operations further comprise:

in response to a command to migrate the data blocks from the primary storage to the secondary storage, indicating, by the secondary controller, in a synchronization data structure to copy all data blocks in the primary storage to the secondary storage; and determining from the synchronization data structure the determined data blocks to prefetch that are indicated as not to copy from the primary storage to the secondary storage, wherein any of the determined data blocks that the synchronization data structure indicates to not copy from the primary storage to the secondary storage are excluded from the prefetch command.

9. A system communicating with a primary controller managing access to a primary storage over a network and managing access to a secondary storage, comprising:

a secondary controller;

a memory; and a computer readable storage medium having program instructions that when executed by the secondary controller perform operations, the operations comprising:

determining data blocks to prefetch from the primary storage to the secondary controller not yet synchronized from the primary storage to the secondary storage in anticipation of future access requests for the data blocks to the secondary controller while data blocks are being synchronized between the primary storage and the secondary storage over the network;

sending a prefetch command to prefetch the determined data blocks to copy from the primary storage to the secondary controller to make available to future access requests received at the secondary controller for the determined data blocks;

determining from a synchronization data structure the determined data blocks to prefetch that are indicated to copy from the primary storage to the secondary storage, wherein the prefetch command only indicates to prefetch the determined data blocks that are indicated to copy from the primary storage to the secondary storage; and indicating in the synchronization data structure to not copy from the primary storage to the secondary storage the determined data blocks prefetched from the primary storage to the secondary controller.

10. The system of claim 9, wherein the operations further comprise:

determining from the synchronization data structure the determined data blocks to prefetch that are indicated not to copy from the primary storage to the secondary storage, wherein any of the determined data blocks that the synchronization data structure indicates to not copy from the primary storage to the secondary storage are excluded from the prefetch command.

11. The system of claim 9, wherein the operations further comprise:

determining a prefetch size satisfying a transfer criteria, wherein the determined data blocks to prefetch are included in prefetch commands having the prefetch size of blocks to prefetch to prefetch all the determined data blocks in the prefetch commands to satisfy the transfer criteria.

12. The system of claim 11, wherein the transfer criteria comprises a round-trip transfer time, wherein the determining the prefetch size comprises:
- determining a maximum prefetch size having an estimated time to transfer, based on a bandwidth and transfer time for the network, that satisfies the round-trip transfer time, wherein the determined prefetch size comprises the maximum prefetch size.

13. The system of claim 11, wherein the transfer criteria comprises a caching size, wherein the determining the prefetch size comprises:
- determining a maximum prefetch size that does not exceed the caching size, wherein the determined prefetch size comprises the maximum prefetch size.

14. The system of claim 9, wherein data becomes out of synchronization between the primary storage and the secondary storage due to a disruption in connectivity in the network between the primary controller and the secondary controller, wherein the operations further comprise:
- indicating, by the secondary controller, in a synchronization data structure to copy all data blocks in the primary storage to the secondary storage in response to reestablishing connectivity to the primary controller after the disruption in connectivity in the network; and
- determining from the synchronization data structure the determined data blocks to prefetch that are indicated as not to copy from the primary storage to the secondary storage, wherein any of the determined data blocks that the synchronization data structure indicates to not copy from the primary storage to the secondary storage are excluded from the prefetch command.

15. The system of claim 9, wherein the operations further comprise:
- in response to a command to migrate the data blocks from the primary storage to the secondary storage, indicating, by the secondary controller, in a synchronization data structure to copy all data blocks in the primary storage to the secondary storage; and
- determining from the synchronization data structure the determined data blocks to prefetch that are indicated as not to copy from the primary storage to the secondary storage, wherein any of the determined data blocks that the synchronization data structure indicates to not copy from the primary storage to the secondary storage are excluded from the prefetch command.

16. A method for managing data synchronized between a primary storage managed by a primary controller and a secondary storage managed by a secondary controller, comprising:
- determining data blocks to prefetch from the primary storage to the secondary controller not yet synchronized from the primary storage to the secondary storage in anticipation of future access requests for the data blocks to the secondary controller while data blocks are being synchronized between the primary storage and the secondary storage over a network;
- sending a prefetch command to prefetch the determined data blocks to copy from the primary storage to the secondary controller to make available to future access requests received at the secondary controller for the determined data blocks;
- determining from a synchronization data structure the determined data blocks to prefetch that are indicated to copy from the primary storage to the secondary storage, wherein the prefetch command only indicates to prefetch the determined data blocks that are indicated to copy from the primary storage to the secondary storage; and
- indicating in the synchronization data structure to not copy from the primary storage to the secondary storage the determined data blocks prefetched from the primary storage to the secondary controller.

17. The method of claim 16, further comprising:
- determining from the synchronization data structure the determined data blocks to prefetch that are indicated not to copy from the primary storage to the secondary storage, wherein any of the determined data blocks that the synchronization data structure indicates to not copy from the primary storage to the secondary storage are excluded from the prefetch command.

18. The method of claim 16, further comprising:
- determining a prefetch size satisfying a transfer criteria, wherein the determined data blocks to prefetch are included in prefetch commands having the prefetch size of blocks to prefetch to prefetch all the determined data blocks in the prefetch commands to satisfy the transfer criteria.

19. The method of claim 18, wherein the transfer criteria comprises a round-trip transfer time, wherein the determining the prefetch size comprises:
- determining a maximum prefetch size having an estimated time to transfer, based on a bandwidth and transfer time for the network, that satisfies the round-trip transfer time, wherein the determined prefetch size comprises the maximum prefetch size.

20. The method of claim 18, wherein the transfer criteria comprises a caching size, wherein the determining the prefetch size comprises:
- determining a maximum prefetch size that does not exceed the caching size, wherein the determined prefetch size comprises the maximum prefetch size.

21. The method of claim 16, wherein data becomes out of synchronization between the primary storage and the secondary storage due to a disruption in connectivity in the network between the primary controller and the secondary controller, further comprising:
- indicating in a synchronization data structure to copy all data blocks in the primary storage to the secondary storage in response to reestablishing connectivity to the primary controller after the disruption in connectivity in the network; and
- determining from the synchronization data structure the determined data blocks to prefetch that are indicated as not to copy from the primary storage to the secondary storage, wherein any of the determined data blocks that the synchronization data structure indicates to not copy from the primary storage to the secondary storage are excluded from the prefetch command.

22. The method of claim 16, further comprising:
- in response to a command to migrate the data blocks from the primary storage to the secondary storage, indicating in a synchronization data structure to copy all data blocks in the primary storage to the secondary storage; and
- determining from the synchronization data structure the determined data blocks to prefetch that are indicated as not to copy from the primary storage to the secondary storage, wherein any of the determined data blocks that the synchronization data structure indicates to not copy from the primary storage to the secondary storage are excluded from the prefetch command.

\* \* \* \* \*